United States Patent [19]

Puri et al.

[11] 4,199,403
[45] Apr. 22, 1980

[54] SEISMIC CORE SHROUD

[75] Inventors: Arun Puri, Simsbury; John F. Mullooly, East Hartford, both of Conn.

[73] Assignee: Combustion Engineering, Inc., Windsor, Conn.

[21] Appl. No.: 853,714

[22] Filed: Nov. 21, 1977

[51] Int. Cl.² .......................................... G21C 15/00
[52] U.S. Cl. .................................... 176/61; 176/50; 176/87
[58] Field of Search .................... 176/50, 61, 87, 40, 176/85, 84

[56] References Cited

U.S. PATENT DOCUMENTS

| 2,998,370 | 8/1961 | Gaunt et al. | 176/85 |
|---|---|---|---|
| 3,032,844 | 5/1962 | Seymour et al. | 176/85 |
| 3,085,960 | 4/1963 | Correc | 176/85 |
| 3,215,608 | 11/1965 | Guenther | 176/85 |
| 3,356,589 | 12/1967 | Grell et al. | 176/85 |
| 3,629,070 | 12/1971 | Stankiewicz | 176/85 |
| 3,720,581 | 3/1973 | Kaser | 176/87 |
| 3,785,924 | 1/1974 | Motari | 176/61 |
| 3,823,066 | 7/1974 | Thome | 176/50 |
| 4,043,867 | 8/1977 | Benque et al. | 176/40 |

FOREIGN PATENT DOCUMENTS

| 1195789 | 11/1959 | France | 176/85 |
|---|---|---|---|
| 921699 | 3/1963 | United Kingdom | 176/85 |

OTHER PUBLICATIONS

"Combustion", Feb. 1970, pp. 8-14, vol. 41, No. 8, by Abbott.

Primary Examiner—Harvey E. Behrend

[57] ABSTRACT

An improved core shroud for a nuclear reactor employs cylindrical bands that surround a coolant boundary and reinforce it by means of support members that engage the coolant boundary and the bands.

4 Claims, 3 Drawing Figures

SEISMIC CORE SHROUD

BACKGROUND OF THE INVENTION

The present invention relates to the core shrouds that confine the flow of coolant in nuclear reactors to their core regions.

A nuclear reactor delivers energy by heating coolant that flows through the fuel-bearing core of the reactor. The purpose of the core shroud is to ensure that a maximum percentage of the coolant that is pumped actually comes into contact with the hot core. In a pressurized-water reactor, the shroud is subjected to substantial pressure differentials, so it must be built in such a manner as to enable it to withstand high loads. In addition to pressure loading, further loading must be anticipated from thermal gradients, and, in the event of a postulated earthquake, the shroud must be strong enough to bear the load of laterally supporting the fuel within the core. As a result of these requirements, it is normal to substantially reinforce the coolant boundary panels. The massive shroud structure that results normally requires extensive machining to permit it to closely fit the core boundary for the purposes of coolant confinement and seismic core support, and this machining adds a large number of man-hours to the manufacturing process. In addition, the machining changes the stiffness characteristics of the core shroud, which makes it impractical to "tune" the shroud to achieve the optimum combination of stiffness and shock-absorbing ability.

SUMMARY OF THE INVENTION

The object of the present invention is therefore a core shroud that has sufficient load-bearing ability to fulfill its function and whose adjustments for fit and "tuning" can be performed independently.

The present invention is to be used in a nuclear-reactor structure that includes fuel assemblies arranged in a core so as to define a core boundary, the fuel assemblies being arranged to permit coolant to flow through them. According to the present invention, there is provided for such a structure a core shroud that includes a coolant boundary, disposed around the core and generally following the shape of the core boundary, for channeling the coolant through the fuel assemblies. The core shroud further includes bands surrounding the coolant boundary, and suport members are provided that extend from the coolant boundary to the bands, thereby enabling transfer of load from the coolant boundary to the bands.

According to a further refinement of the invention, the support members are oriented longitudinally in the direction of the coolant flow.

BRIEF DESCRIPTION OF THE DRAWINGS

These and further features and advantages of the present invention can be appreciated by referring to the drawings attached, in which.

DETAILED DESCRIPTION OF THE PREFERRED EMBODIMENT

Figure 1:
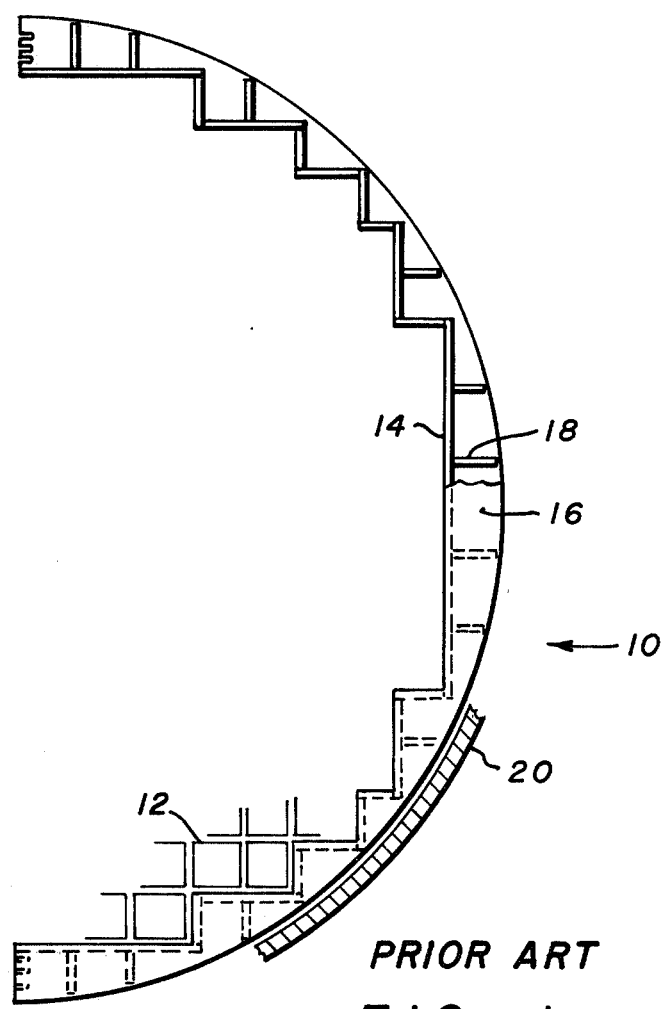
FIG. 1 is a plan view, partly in section, of a prior-art core shroud.

A typical core shroud of the type known in the prior art is shown in FIG. 1. Fueld assemblies 12, extending longitudinally into and out of the page, are arranged in a core, which constitutes the region in which the nuclear reactions take place. Coolant, typically water, is pumped through the core from bottom to top, absorbing heat as it traverses the core. In order to confine the coolant to the core area, a shroud, indicated generally by reference 10, is provided. A coolant boundary 14, made of 1⅜ inch-thick stainless-steel plate, generally follows the shape of the perimeter of the core. In order to provide added strength, a series of girth ribs indicated by numeral 16 are provided at various elevations on the exterior of the coolant boundary. Only one is shown in FIG. 1, but around half a dozen of the same shape are provided at various elevations below the one shown.

The shroud is also provided with vertical ribs 18 that contribute to the strength of the structure. The thickness of the coolant boundary, the vertical ribs, and the girth ribs are all provided in order to meet the strength requirements imposed by the various expected loads.

The remaining item in FIG. 1 is core barrel 20, which has the function of confirming incoming coolant to its exterior until the coolant has reached the lower end of the core, where the coolant passes from the exterior of the core barrel to the interior of the core shroud.

Between core barrel 20 and coolant boundary 14 is an area through which a small leakage flow of coolant is allowed to pass. This coolant flow is important because the shroud itself is heated by the neutron flux emitted from the core, and the shroud must therefore be cooled in order to reduce thermal stresses and prevent reduction in material strength. As can be appreciated from the fact that the vertical and girth ribs are at right angles, coolant flow in this area is broken up by the ribs, and the cooling afforded the shroud by this flow is quite uneven. But the girth and vertical ribs are nonetheless required, because they reinforce the coolant boundary against pressure stresses and contribute to its ability to bear seismically induced loads.

This prior-art core shroud requires many man-hours of welding. The welding must in general be performed manually because the arrangement of the ribs precludes most automatic methods of welding. The manual welding, in addition to being rather time-consuming, is usually somewhat less uniform than automatic welding. As a result there are many more welds that are proved unacceptable during non-destructive testing than there would be if the welding had been performed automatically. In addition to the welding difficulties, manufacture of the core shroud is complicated by the need to adjust the coolant boundary by extensive machining, which must be performed after the core shroud has already been assembled. This machining, of course, is quite expensive and time-consuming, and it necessitates the provision of extra thickness in the plate used for coolant boundary 14, because stock is lost by machining. Accordingly, the manufacture of the prior-art core shroud is rather expensive. In addition, any tuning performed at the design stage to optimize the combination of strength and shock-absorbing ability can be expected to be neutralized by the machining operation. In spite of these drawbacks, the shroud of FIG. 1 compares favorably with other prior-art designs because it is capable of independently withstanding expected pressure stresses and seismic loads. Thus, upon assembly it may be merely lowered into the core barrel and welded to the lower support structure. If the shroud were not structurally independent of the core barrel—that is, if the shroud required support from the core barrel, assembly would be considerably complicated due to the necessity of conforming to regulatory requirements on the core-barrel welds.

Figures 2, 3:
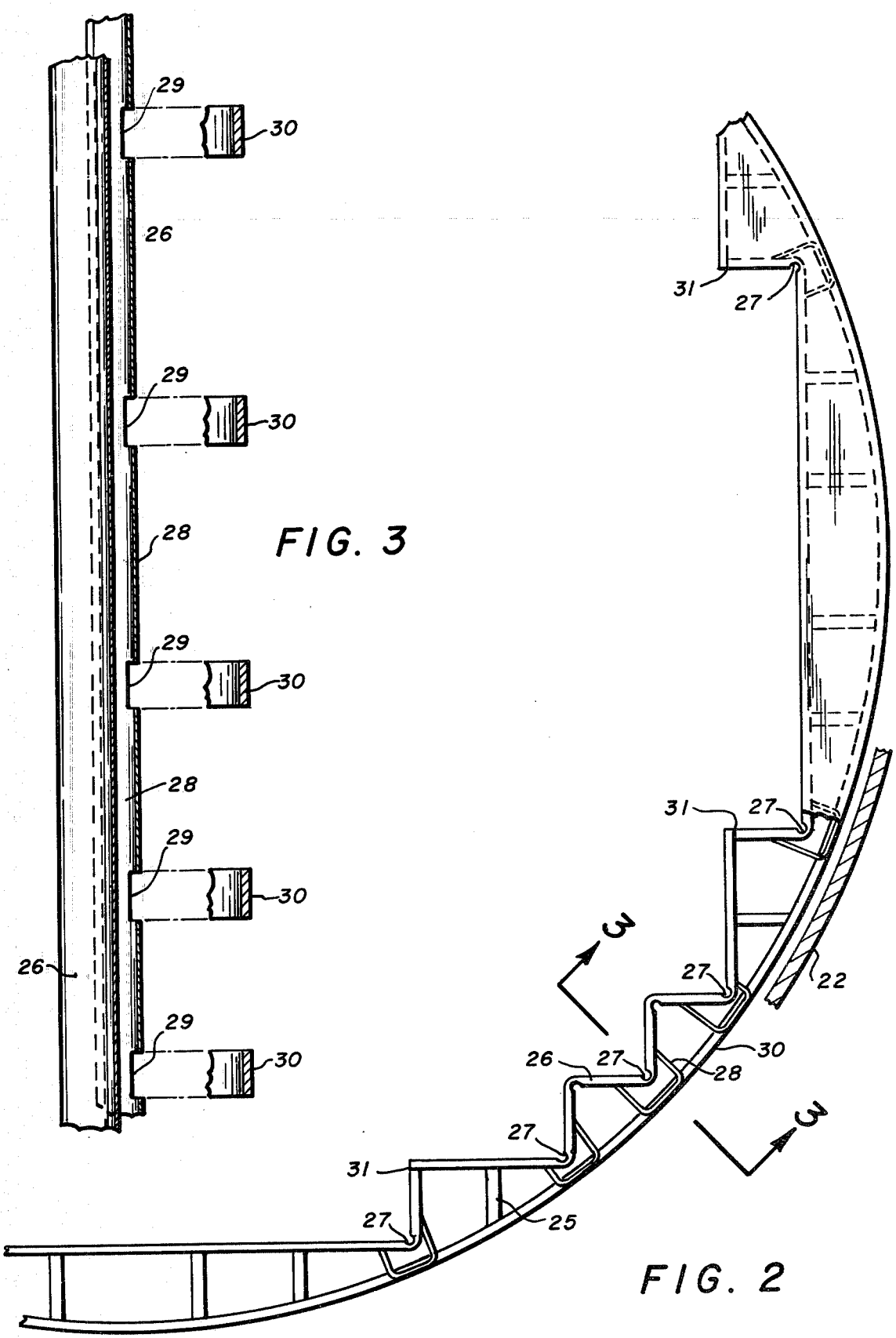
FIG. 2 is a similar representation of the core shroud of the present invention.
FIG. 3 is a section taken at lines 3—3 of FIG. 2.

As shown in FIG. 2, the coolant boundary 26 of the present invention is made of sections connected at joints 31. There are eight sections in all, four of which are visible in FIG. 2. Channel members 28, which have U-shaped cross sections, extend along the heights of the outwardly-directed corners 27 of the coolant boundary, straddling them. Vertical ribs 25, similar to ribs 18 of FIG. 1, also extend up the height of the coolant boundary. Cylindrical bands 30 fit in openings 29 that are cut along the height of each channel member.

The coolant-boundary sections are each individually fit to the core boundary by bending them at their corners using conventional techniques. When a section has been bent to the desired shape, channel members 28 are welded to them. Vertical ribs 25 are also welded to the sections. Once each section has been bent to the desired shape and has had channel members and vertical ribs attached, the sections are welded together to form a completed coolant boundary. Each band 30 is then brought in as a split band having a radius slightly greater than that ultimately intended; it is therefore able to fit around the shroud. The band 30 is fitted in openings 29, and its ends are pressed together and welded. With the bands in place, vertical ribs 25 can be welded at the band elevations. The channel members and vertical ribs are thus in positions to act as support members that transfer load from the coolant boundary to the bands. Construction is then complete.

Due to the unique construction of the present invention, several advantages are obtained. Since the coolant boundary is not the principal stress-bearing member, it is not necessary that it be as thick as in the prior-art design. Thus, as was pointed out above, it is possible to bend the pieces, rather than machine them, in order to make them assume the desired shape. This type of manufacture of the coolant boundary to the shape of the core boundary has little effect on the design stiffness of the overall structure because there is no change in the thickness of the material due to machining. Thus, it is feasible with the present invention to optimize the combination of stiffness and shock-absorbing ability at the design stage with the knowledge that the carefully-adjusted characteristics of the shroud will not be modified by the construction process.

Another advantage of the present design is that the interference with bottom-to-top coolant flow in the space between coolant boundary 26 and core barrel 22 is eliminated, so more efficient cooling of the coolant boundary is permitted. This is due to the fact that the girth ribs hve been replaced by bands 30, and the bands are coupled to the coolant boundary 26 by support members 25 and 28. The thicknesses of the strut portions of the support members 25, 28, which extend from the coolant boundary 26 to the bands 30, are smaller in the circumferential direction than the distance between proximate struts. The resulting uniformity of cooling can be further enhanced by providing holes or cut-outs in the channel members in order to provide for fluid communication between the interiors of the channel members and remainder of the leakage-flow region. The replacement of girth ribs with bands also results in more uniform loading being experienced by the bands than would be experienced by girth ribs.

A final advantage is that the welding of the vertical ribs and channel members, no longer interrupted by the presence of girth ribs, can be performed by automatic machinery.

While the present invention has been described in terms of a preferred embodiment, many alterations, modifications, and variations will become apparent to those skilled in the art. It is intended by the appended claims to include all such alterations, modifications, and variations as are included within the scope of the appended claims.

What is claimed is:

1. In a structure for a water-cooled and water-moderated nuclear reactor that includes fuel assemblies arranged in a core within a reactor vessel, thereby defining a core boundary, and a core barrel disposed around the core for confining coolant entering the vessel to the core barrel exterior until the coolant has reached the lower end of the core, a core shroud within the barrel for directing the coolant flow in a predetermined longitudinally upward direction through the fuel assemblies, comprising:
    a. a coolant boundary surrounding and spaced from the fuel assemblies, having an integral inner surface generally following the shape and extending the entire longitudinal length of the core boundary, for channeling the coolant through the fuel assemblies;
    b. a plurality of longitudinally spaced, substantially cylindrical bands positioned inside the core barrel and surrounding the coolant boundary; and
    c. a plurality of discrete support members for transferring loads from the coolant boundary to bands, including strut means extending between the coolant boundary and each band, the thicknesses of the strut means in the circumferential direction being smaller than the distance between proximate struts, whereby uninterrupted longitudinal flow between the coolant boundary and the core barrel may be maintained for cooling the coolant boundary.

2. A core shroud as recited in claim 1, wherein the support members are longitudinally oriented in the direction of the coolant flow.

3. A core shroud as recited in claim 2, wherein the core shroud is structurally independent of the core barrel.

4. A core shroud as recited in claim 1, wherein the core shroud is structurally independent of the core barrel.

* * * * *